United States Patent [19]

Viellard

[11] Patent Number: 4,741,578
[45] Date of Patent: May 3, 1988

[54] ASSEMBLY OF COMPOSITE MATERIALS FORMING A SPOKE WHEEL RIM

[76] Inventor: Paul-Henri Viellard, 11 rue de Sontay, F-75116, Paris, France

[21] Appl. No.: 862,352
[22] PCT Filed: Aug. 19, 1985
[86] PCT No.: PCT/FR85/00225
  § 371 Date: Apr. 21, 1986
  § 102(e) Date: Apr. 21, 1986
[87] PCT Pub. No.: WO86/01463
  PCT Pub. Date: Mar. 13, 1986

[30] Foreign Application Priority Data

Aug. 21, 1984 [FR] France .................... 84 13024
Aug. 19, 1985 [FR] France .................... 85 12496

[51] Int. Cl.⁴ ............................................. B60B 5/02
[52] U.S. Cl. ............................... 301/63 PW; 301/58
[58] Field of Search .............. 301/63 PW, 95–98, 301/104, 58; 305/56; 152/323, 325

[56] References Cited

U.S. PATENT DOCUMENTS

| | | | |
|---|---|---|---|
| 664,647 | 12/1900 | Kinney et al. | 301/58 |
| 688,399 | 12/1901 | Ellis et al. | 301/98 |
| 1,382,122 | 6/1921 | Ricketts | 301/98 |
| 4,146,274 | 3/1979 | Lejeune | 301/63 PW X |
| 4,173,992 | 11/1979 | Lejeune | 301/63 PW X |
| 4,314,964 | 2/1982 | Ferrary | 301/63 PW X |
| 4,349,234 | 9/1982 | Hartmann | 305/56 |
| 4,483,729 | 9/1984 | Fujisaki et al. | 301/63 PW X |
| 4,607,892 | 8/1986 | Payne et al. | 305/56 |

FOREIGN PATENT DOCUMENTS

| | | | |
|---|---|---|---|
| 2703753 | 8/1977 | Fed. Rep. of Germany | 301/104 |
| 363145 | 9/1938 | Italy | 301/97 |
| 456,848 | 4/1950 | Italy | 301/95 |
| 0068403 | 5/1980 | Japan | 301/95 |

Primary Examiner—Robert B. Reeves
Assistant Examiner—Russell D. Stormer
Attorney, Agent, or Firm—William A. Drucker

[57] ABSTRACT

A composite material assembly forming a spoked wheel rim comprising carbon fibers disposed about shock resistant glass or synthetic fiber layers, these layers absorbing the tension exerted by the nuts tightening the spokes and thus providing good cohesion of the assembly forming the rim by compression of the carbon fibers situated between the heads of the nuts and the rings.

5 Claims, 1 Drawing Sheet

ASSEMBLY OF COMPOSITE MATERIALS FORMING A SPOKE WHEEL RIM

BACKGROUND OF THE INVENTION

It is clear that the lighter a bicycle the better will be the performances of the cyclist. For lightening the whole of the bicycle, the constituent elements thereof must be lightened without making the whole fragile.

Thus, the frame, the handlebars, the wheels may be successively lightened.

Lightening of the wheels of a bicycle offers considerable advantages for the user not only because of a lower weight to be driven, or a lower inertia of the wheel which also allows better acceleration, but also for maintaining the balance of the cyclist: the ligher the wheel, the better the balance.

For lightening the rim, the use of carbon fibers associated with resins may be contemplated, but may have two drawbacks: when they break, they cause the sudden and practically complete destruction of the rim, which may result in the cyclist falling; finally, carbon fibers wear away rapidly through the friction of the brake blocks.

SUMMARY OF THE INVENTION

The devices of the invention overcome these drawbacks by allowing carbon fibers to be used for lightening the rim by including therein either a metal layer, or one or more glass or synthetic fiber layers having good resistance to compression and shocks. Such layers, since they take up the tension of the spokes through the clamping nuts, thus provide good cohesion of the materials forming the wheel.

In addition, so as to accomodate the friction of the brake blocks, a metal or synthetic coating may be provided on the side faces of the rim or these side faces may be covered with a layer of glass or synthetic fibers associated with resins, these substances withstanding the rubbing of the brake blocks.

BRIEF DESCRIPTION OF THE DRAWINGS

For a better understanding of the invention, embodiments thereof will be described hereafter without any limitative character, with reference to the accompanying schematical drawings in which.

DESCRIPTION OF THE PREFERRED EMBODIMENTS

Figure 1:
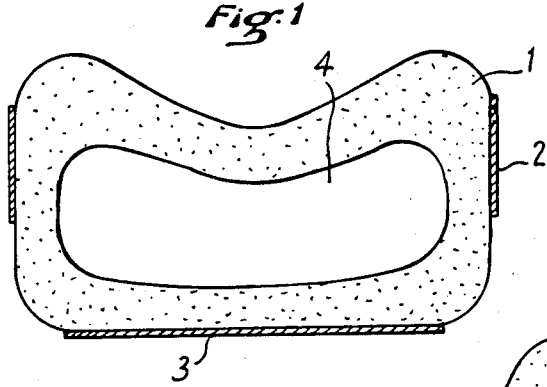
FIG. 1 is a cross sectional view of the rim.

The device shown in FIG. 1 is formed of carbon fibers 1 associated with resins forming the rim enclosing a pocket 4 which may be either empty or filled with a hardened foam of great lightness which is injected for the sole purpose of molding the rim.

Said rim receives on its external part a metal layer 3 bonded during polymerization of the resins associated with the carbon fibers and plates 2 made from metal or another material, more particularly varnish, paint, plastic, laid on the right hand and left hand outer side faces of the rim 1 for receiving the friction of the brake blocks.

Metal layer 3 is here shown flat but it could have any other profile giving it better rigidity and better resistance to twisting or shearing forces.

Figure 2:
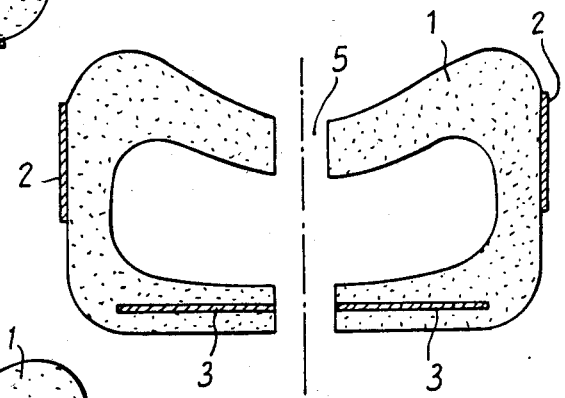
FIG. 2 is also a cross sectional view but at the level of the passage of the inflation valve.

FIG. 2 shows the circular hole 5 through which will be passed the inflation valve of the tubular tire and the metal layer which is no longer at the inner periphery of the wheel but embedded in the carbon fibers 1.

Figure 3:
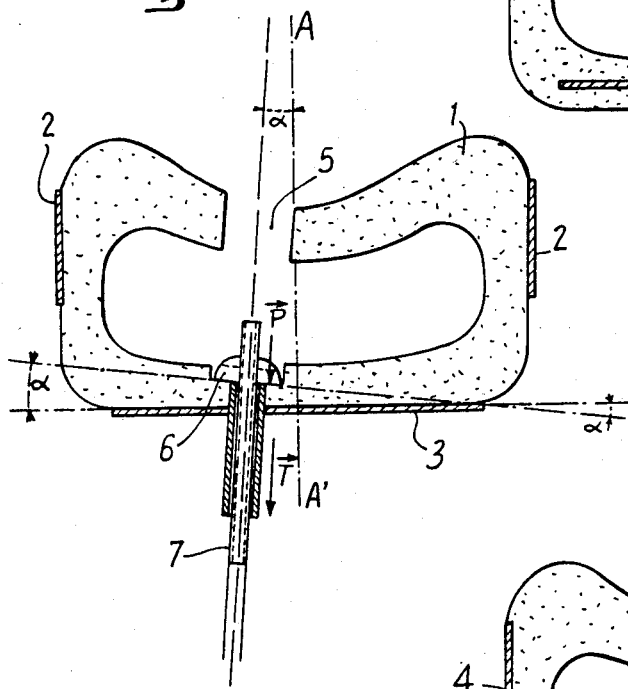
FIGS. 3 and 4 are cross sectional views of the rim at the level of the passage of a spoke, each of these Figures is a variant of the device.

FIG. 3 shows the fitting of a spoke 7 to a rim formed in the way shown in FIG. 1. Hole 5 is provided for introducing the nut 6 for tightening the spoke 7. This nut 6 provides the tension T exerted by spoke 7 and thus exerts a pressure P on the underlying carbon fibers which are thus compressed between the head of nut 6 and the metal plate 3. This pinching maintains the cohesion of the internal strip of the rim and avoids destruction of the wheel in the case of shock. This metal layer 3 also prevents wear of the carbon fibers at the level of the passage of nut 6 in the rim.

Figure 4:
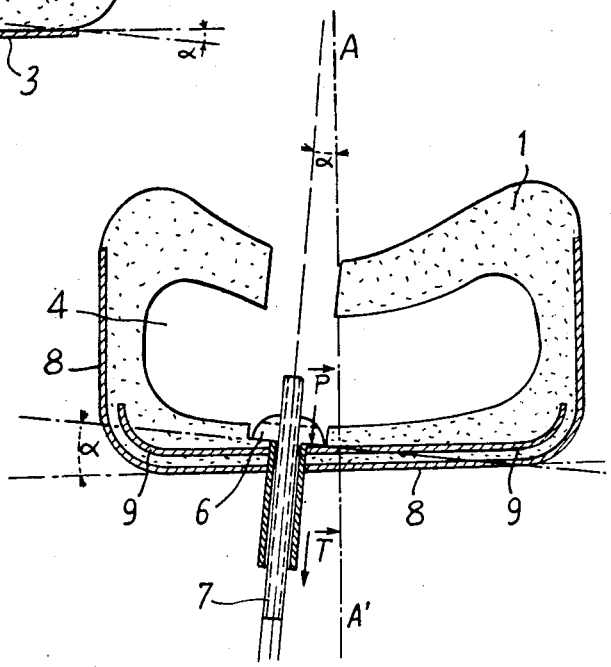

FIG. 4 is a cross sectional view of the rim and of a spoke 7 along its diametrical axis. This is a variant of the preceding rim in that it receives on its external part a layer of glass or aramide fibers 8 or a hybrid layer of carbon fibers and aramide fibers or other synthetic fibers having a good resistance to shocks and to the friction of the brake blocks on the lateral zones of the rim.

Other layers could also be disposed. The head of nut 6 which ensures the tension T exerted by spoke 7 comes to bear on the layer 9 of glass or aramide or other synthetic fibers having a good resistance to shocks and compresses the carbon fibers situated between it 9 and the layer 8, thus providing good cohesion of the assembly forming the rim. It will be noted that the bearing surface of the head of the nut 6 forms an angle $\alpha$ with the fiber layers 8 and 9. This angle $\alpha$ depends on the radius of the rim and on the width of the axis of the wheel. The spokes are fitted alternately on the right and on the left of the axis (A) of the wheel.

What is claimed is:

1. A spoke wheel rim assembly made of light composite material which comprises:
   (a) a rim portion made of carbon fibers embedded in harden resins,
   (b) at least a pair of shock resistant layers, one of said layers being embedded within said rim portion and another of said layers on an outer surface of said rim portion,
   (c) spokes extending through said rim portion, and
   (d) nut heads for tightening said spokes and pressing on said embedded shock resistant layer to pinch the carbon fibers between said layers to provide a good cohesion of the assembly even if the carbon fibers are broken.

2. The spoke wheel rim as claimed in claim 1 wherein said layers are made of metal.

3. The spoke wheel rim as claimed in claim 1 wherein said layers are made of glass fibers.

4. The spoke wheel rim as claimed in claim 1 wherein said layers are made of synthetic fibers.

5. The spoke wheel rim as claimed in claim 1 wherein said layers have a flat profile.

* * * * *